(12) United States Patent
Kambhampati et al.

(10) Patent No.: US 8,860,939 B2
(45) Date of Patent: Oct. 14, 2014

(54) METHOD AND SYSTEM FOR OPTICAL SPECTROSCOPY

(71) Applicant: The Royal Institution for the Advancement of Learning / McGill University, Montreal (CA)

(72) Inventors: Patanjali Kambhampati, Lachine (CA); Jonathan Saari, Montreal (CA); Pooja Tyagi, Montreal (CA)

(73) Assignee: The Royal Institution for the Advancement of Learning/McGill University, Montreal (CA)

( * ) Notice: Subject to any disclaimer, the term of this patent is extended or adjusted under 35 U.S.C. 154(b) by 0 days.

(21) Appl. No.: 13/916,813

(22) Filed: Jun. 13, 2013

(65) Prior Publication Data

US 2013/0335735 A1    Dec. 19, 2013

Related U.S. Application Data

(60) Provisional application No. 61/659,002, filed on Jun. 13, 2012.

(51) Int. Cl.
*G01J 4/00* (2006.01)
*G01J 3/10* (2006.01)
*G01J 3/12* (2006.01)

(52) U.S. Cl.
CPC . *G01J 3/10* (2013.01); *G01J 3/1256* (2013.01)
USPC .......................................... 356/364

(58) Field of Classification Search
CPC ............................ G01J 3/10; G01J 3/1256
USPC .................... 356/364–370, 300–334, 451
See application file for complete search history.

(56) References Cited

U.S. PATENT DOCUMENTS 7,352,469 B2 *   4/2008   McGrew ................... 356/451
7,760,342 B2 *   7/2010   Zanni et al. ................ 356/51

OTHER PUBLICATIONS

Jeffrey A. Myers "Two-color two-dimensional Fourier transform electronic spectroscopy with a pulse-shaper", Oct. 27, 2008.*
Chris T. Middleton, "Polarization shaping in the mid-IR and polarization-based balanced heterodyne detection with application to 2D IR spectroscopy", Aug. 17, 2009.*
Lauren De Flores "Two-dimensional Fourier transform spectroscopy in the pump—probe geometry" Oct. 15, 2007.*

* cited by examiner

*Primary Examiner* — Kara E Geisel
*Assistant Examiner* — Maurice Smith
(74) *Attorney, Agent, or Firm* — The Law Office of Michael E. Kondoudis

(57) ABSTRACT

Two dimensional (2D) optical spectroscopy, wherein the spectrum has an excitation and an emission axis, reveals information formerly hidden in one-dimensional (1D) optical spectroscopy. However, current two dimensional optical spectroscopy systems are complex laboratory arrangements and accordingly limited in deployment. According to embodiments of the invention a monolithic platform providing significantly reduced complexity and increased robustness is provided allowing for "black-box" modules allowing commercial deployment of 2D optical spectroscopy instruments. Additionally, the invention supports high pulse repetition rates as well as one quantum and two quantum measurements under electronic control.

9 Claims, 15 Drawing Sheets

2D Electronic Spectroscopy

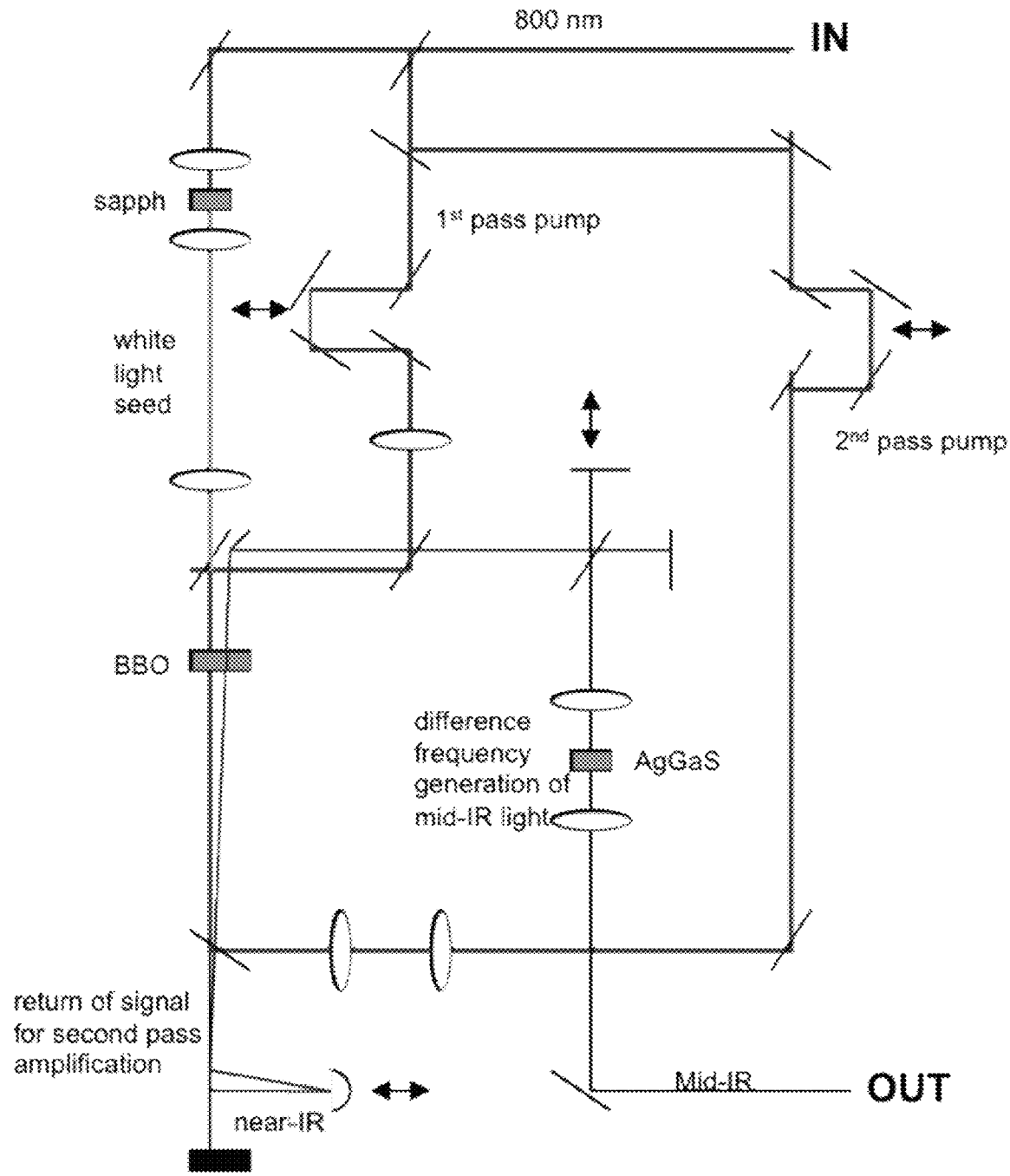
Figure 2C　　　　　　　　　　　PRIOR ART

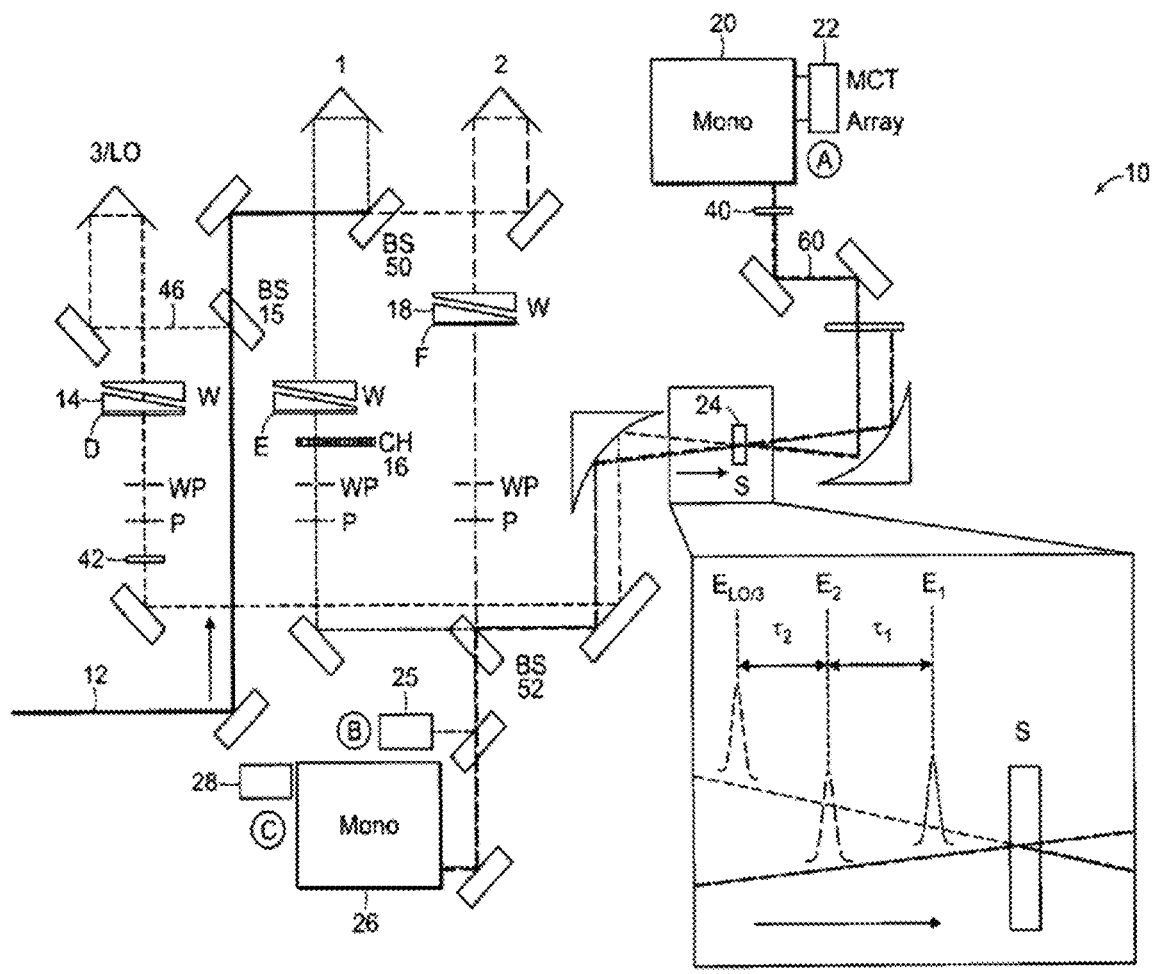
Figure 3B　　　　　　　　　　　　　　　　PRIOR ART

METHOD AND SYSTEM FOR OPTICAL SPECTROSCOPY

CROSS-REFERENCE TO RELATED APPLICATIONS

This patent application claims the benefit of U.S. Provisional Patent Application 61/659,002 filed Jun. 13, 2012 entitled "Method and System for Optical Spectroscopy", the entire contents of which are included by reference.

FIELD OF THE INVENTION

The present invention relates to the optical spectrometry in particular coherent two-dimensional optical spectrometry.

BACKGROUND OF THE INVENTION

Spectroscopy is one of the primary methods of characterizing molecules, materials, pharmaceuticals, or even devices. The simplest spectroscopic instruments measure one dimensional spectral data, e.g. ultraviolet (UV)-visible (Vis) spectroscopy for electronic transitions, Fourier transform infrared spectroscopy (FTIR) spectroscopy for vibrational transitions, and nuclear magnetic resonance (NMR) spectroscopy for nuclear transitions. Based upon the maturity of these simple techniques commercial instrumentation systems are available from several vendors which may provide in addition to the spectral data acquisition supporting features such as automated sample handling, spectral signal analysis, and material identification for example. However, all of these approaches suffer a common drawback that the resulting spectra from a sample may be so congested as to render the desired "fingerprinting" of spectral characteristics to identify components of the sample impossible To circumvent this spectral congestion problem within NMR two-dimensional NMR was proposed by Professor J. Jeener in 1971 and first implemented in 1976 at the Université Libre de Bruxelles, in 1971. This experiment was later implemented by Aue et al in "Two-Dimensional Spectroscopy—Application to Nuclear Magnetic Resonance" (J. Chem. Phys., Vol. 64, pp. 2229-2246). In these measurements the spectrum has an excitation and an emission axis, giving a two-dimensional (2D) spectrum which reveals the information formerly hidden in one-dimensional (1D) spectroscopy such as depicted in FIG. 1A. In each graph the diagonal would corresponds to observing the two emission peaks within a 1D spectrum. However, in the 2D spectrum one plots the excitation and the emission axes, along with the time at which the 2D spectrum is obtained. Hence one can directly observe dynamics from one state to the next, even when the 1D spectrum shows no features due to congestion. In the intervening 35 years 2D-NMR spectrometers have gone from proof-of-concept to being standard commercial instruments offered alongside commercial 1D spectrometers. Also depicted in FIG. 1B is a 2D spectrum for excitons within a semiconductor quantum well with the excitonic levels depicted in FIG. 1C whilst the associated time difference between excitation and emission is depicted in FIG. 1D.

Now considering optical spectrometry commercial and research 1D spectrometers reveal a static in time spectrum of the system being characterized whereas it is clear that systems evolve with time, such as for example wherein excitations are subsequently followed by emissions at times dependent upon the lifetime of the excited state. In some instances the excitation (optical pump) is followed by a second optical signal (optical probe) whereas in others it is not. In the former the optical probe stimulates emission whereas in the latter it is spontaneous. Hence it would be beneficial to also provide time resolved 1D spectral data within the deep ultraviolet (DUV), UV-Vis, and infrared (IR), both near infrared (NIR) and far infrared (FIR). Such time resolved 1D spectra are obtained via systems employing pulsed optical pump/optical probe spectroscopy where the time at which the probe pulse measures the 1D spectrum is dictated by the time interval between the optical pump and optical probe pulses. This approach has been developed since the 1970s and is routinely used by thousands of researchers worldwide and as the technology and methods of time resolved 1D spectroscopy have matured then commercial time resolved 1D UV-Vis spectrometers have become available. However, the spectral congestion problem still remains for FIR, NIR, UV-Vis or DUV spectroscopy both direct and Fourier transform.

Circa 2000, the ultrafast laser spectroscopy community developed an optical analog of 2D-NMR at both IR and UV-Vis energies allowing characterization of vibration and electronic transitions in materials respectively. Whilst the system developed is a powerful solution to this spectroscopic problem it is also enormously complex so that whilst these time resolved 2D IR and 2D UV-Vis spectroscopy measurements have yielded remarkable results for the small number of pioneering researchers, the methods themselves are so complex that globally only about a dozen groups have establish such methods. Accordingly it would be beneficial to provide the global community with a commercial solution to 2D IR and 2D UV-Vis spectroscopy. Accordingly, to do so requires a fundamental reconsideration of the technique given the complexity of the current research systems.

Amongst the global research groups within the field are Keith Nelson Group at Massachusetts Institute of Technology and the Graham Fleming Group at University of California, Berkeley. Considering the instrumentation of these groups then we find the following instrumentation solutions as depicted in respect of FIGS. 2A and 2B.

FIG. 2A depicts the two-dimensional Fourier Transform optical spectroscopy (FTOPT) system of the Keith Nelson Group (http://nelson.mit.edu/index.php?option=com_content&view=article&id=27&Itemid=56). Accordingly as depicted a laser pulse first enters the beam shaper (blue box), consisting of a spatial light modular (SLM 1) at the focus of a telescope. A phase pattern is applied that generates the desired spatial beam geometry wherein the beams then enter the pulse shaper (green box). A telescope first inverts the beams, which then impinge upon a grating G, spectrally dispersing the beams. A cylindrical lens CL focuses the spectrum onto SLM 2. The phase pattern applied in the horizontal dimension controls the temporal (spectral) phase and the sawtooth pattern in the vertical dimension diffracts the beams (d). The diffracted beams return through the pulse-shaping apparatus, hitting a pick off minor (M) that sends the beams to the sample. The signal is generated in a phase-matched direction given by the specified beam geometry. The full amplitude and phase of the emitted signal is retrieved via heterodyne detection and spectral interferometry.

For the Graham Fleming Group, their techniques include 2D Electronic Spectroscopy as depicted in FIG. 2B (http://www.cchem.berkeley.edu/grfgrp/pages/Techniques/2D.html), wherein the ultrafast optical source is split into four optical beams which are then individually set in polarization, and Pump Probe Spectroscopy as depicted in FIG. 2C (http://www.cchem.berkeley.edu/grfgrp/pages/Techniques/Pump_Probe.html) wherein the optical system allows pumping with 800 nm, 400 nm, visible, and near-infrared light. The 800/400 nm pump line is produced by the fundamental or second harmonic of a regenerative amplifier and visible and near-infrared light is generated from an optical parametric amplifier (OPA). As illustrated the OPA is a two-pass OPA creating near-infrared signal and idler beams from an 800 nm input beam which are then overlapped in a difference frequency generating crystal (e.g. AgGaS). The pump and probe are overlapped onto the sample and changes in the intensity of the probe beam are detected at an imposed frequency created using an optical chopper and measured using a lock-in amplifier technique. These changes are monitored as a function of time, and a reference mid-IR beam passes through the sample at a separate location to allow us to subtract general fluctuations in the laser beam.

Also within the prior art are solutions to 2D optical spectroscopy including World Patent Application WO/2009/143957 and corresponding US Patent Application 2011/0,141,467 by Brixner et. al. from the University of Wurzburg entitled "Device and Method for Coherent Multi-Dimensional Optical Spectroscopy." In this approach, as depicted in FIG. 3A, a single laser source is combined with a series of beam splitters, lenses and collimators and is based upon a design originating from the lead inventors post-doctoral work with the Graham Fleming group at University of California—Berkeley. Due to the design approach dozens of vibration susceptible optics are employed as common with the design from the University of California—Berkeley. World Patent Application WO/2009/075702 and corresponding US Patent Application 2010/0,171,952 by Deflores et al entitled "Two-Dimensional Fourier Transform Spectrometer" from the Massachusetts Institute of Technology (MIT) wherein, as depicted in FIG. 3B, three optical signals are employed to resolve the collinear signals rather than the original approach of using four separate signals (a fifth signal is also used to assist in alignment). This three signal approach is correspondingly complex from a hardware design and integration perspective.

U.S. Pat. No. 7,760,342 by Zanni et. al entitled "Multi-Dimensional Spectrometer" from University of Wisconsin, as depicted in FIG. 3C, employs a single pulse shaper to perform "one quantum" 2D experiments in a non-collinear geometry wherein the pump pulse profile, typically comprising two or more sub-pulses, and the probe pulse are incident to the sample. Whilst the sub-pulses contact the sample of interest collinearly, having followed the same optical path, the probe pulse is offset at an angle such that the sub-pulses and probe pulse only intersect at the sample. Examples of pulse shapers taught by Zanni include acousto-optic modulators, spatial light modulators, and digital micro-mirror devices in conjunction with diffraction gratings, folding optics, beam splitters etc. Accordingly the resulting optical assembly still comprises a large number of optical elements requiring alignment and isolation for vibration etc.

In contrast the inventors have established an approach exploiting a monolithic platform which provides simplicity and robustness lacking in the prior art enabling the invention to be packaged into a simple "black-box" module for commercial deployment in 2D optical spectroscopy instruments. The invention exploits a dual pulse shaper approach that uniquely enables polarization shaping of the complete electric field without any moving parts. This approach enables both one quantum and two quantum signals, polarization switching to probe more systems, and a completely co-linear beam geometry that enables simpler design.

Accordingly the inventors have developed an approach to 2D optical spectroscopy that eliminates the substantial number of optical elements and associated complexity and significant number of scientists currently needed to actually perform these measurements. Initial preliminary tests presented at FEMTO10—Madrid Conference on Femtochemistry (July 2011), 18th International Conference on Ultrafast Phenomena (July 2012) and to be presented at the Ultrafast Phenomena conference (2012) and the American Chemical Society Fall National Meeting (August 2012) have shown that simple approach is up to four times more stable than the complex instruments of the two leading research groups, namely Keith Nelson Group at Massachusetts Institute of Technology and the Graham Fleming Group at University of California, Berkeley. Beneficially the measurement system developed by the author is solid state, thereby removing all moving parts, but also uniquely provides for polarization shaping of the optical pulses thereby giving rise to further improvements in performance and functionality.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate disadvantages in the prior art relating to optical spectrometry in particular coherent two-dimensional optical spectrometry.

In accordance with an embodiment of the invention there is provided a method comprising:
receiving from an optical source a plurality of pulses, each pulse characterized by a profile relating to at least one of frequency, phase, polarization and time;
coupling the pulse to a pair of pulse shapers to generate a pair of modified pulses, each pulse shaper being able to modify the profile of the pulse in at least one aspect;
coupling the pair of modified pulses to a sample via a combiner positionable between a first position and a second position, wherein
in the first position the combiner establishes a pump-probe configuration of characterizing the sample, and
in the second position the combiner establishes a collinear configuration of characterizing the sample.

In accordance with an embodiment of the invention there is provided a system comprising
a beam splitter for receiving from an optical source coupled to the system a plurality of pulses, each pulse characterized by a profile relating to at least one of frequency, phase, polarization and time;
first and second pulse shapers optically coupled to each output of the beam splitter, each pulse shaper being able to modify the profile of the pulse in at least one aspect;
a combiner receiving the outputs from the first and second pulse shapers and coupling them to a sample to be characterized, the combiner positionable between a first position and a second position, wherein
in the first position the combiner establishes a pump-probe configuration of characterizing the sample, and
in the second position the combiner establishes a collinear configuration of characterizing the sample.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIGS. 2B and 2C depict 2D optical and pump probe spectrometers employed by the Graham Fleming Group at University of California, Berkeley;

FIGS. 3A through 3C depict 2D optical spectrometers according to the prior art of Brixner, Deflores, and Zanni in US Patent Applications 2011/0,141,467 and 2010/0,171,952 and U.S. Pat. No. 7,760,342 respectively;

DETAILED DESCRIPTION

Figure 1A:
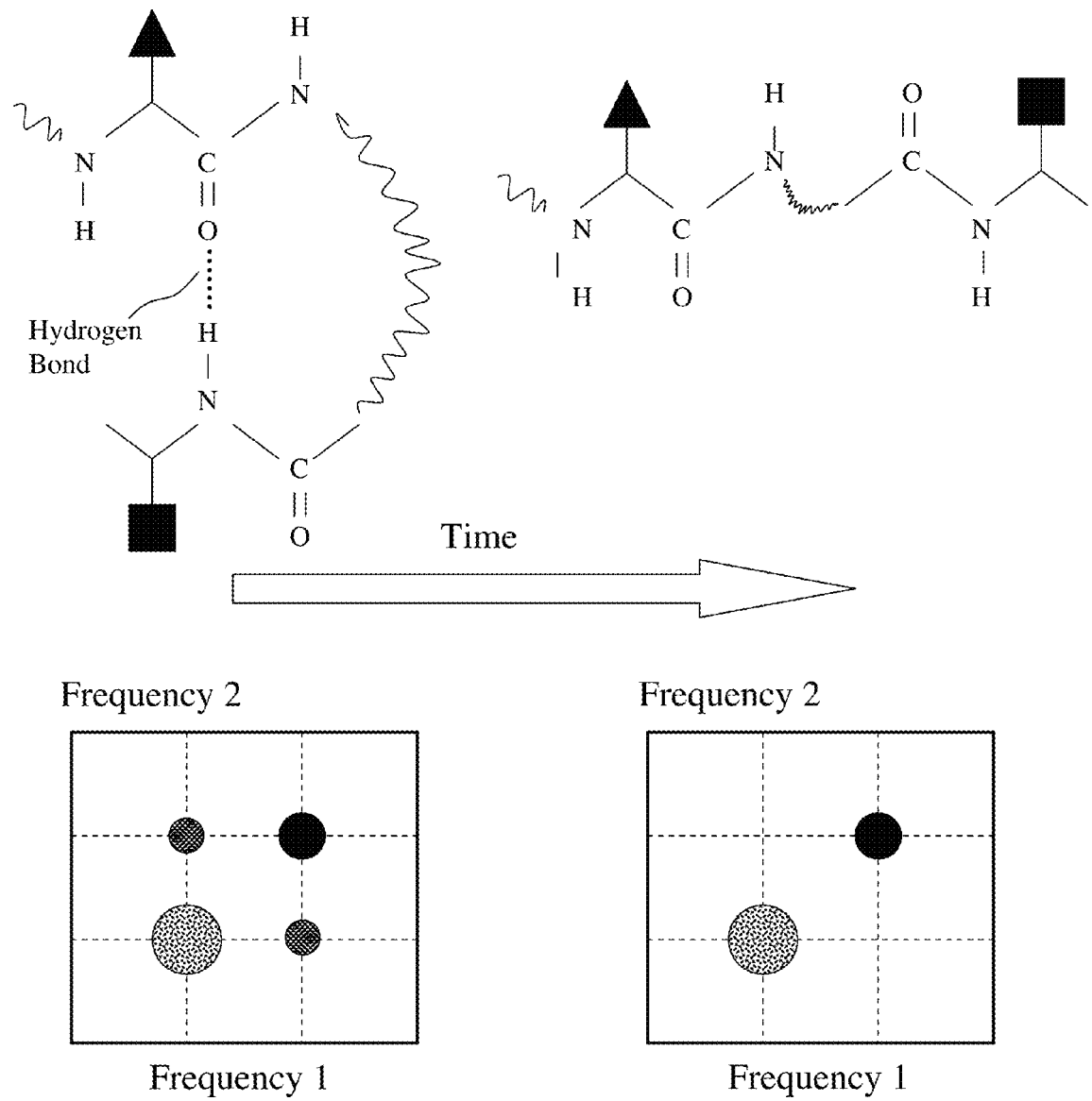
FIGS. 1A through 1D depict the principles behind 2D optical spectroscopy.
Figure 1B:
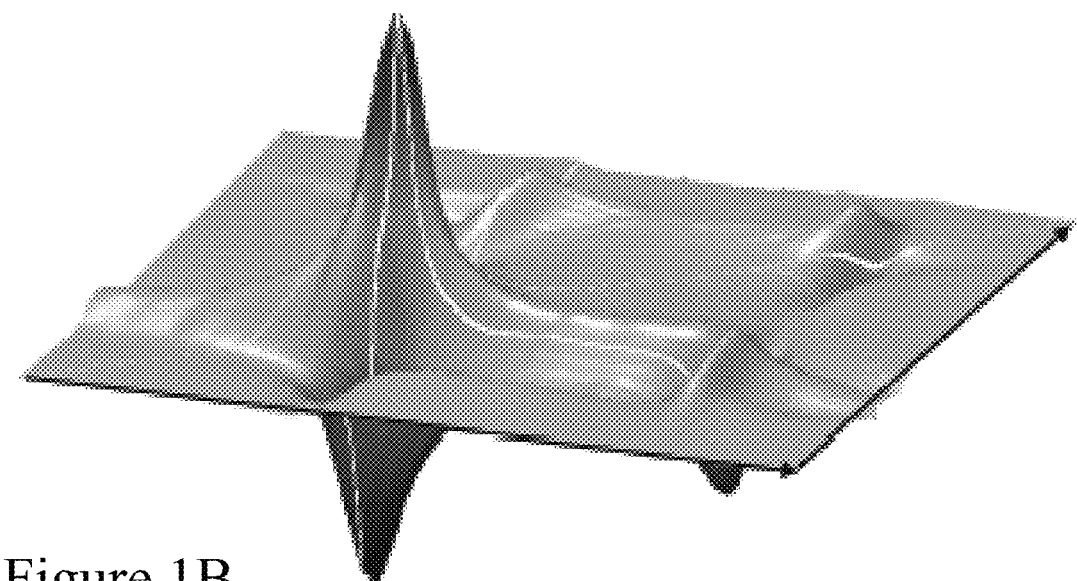
Figure 1C:
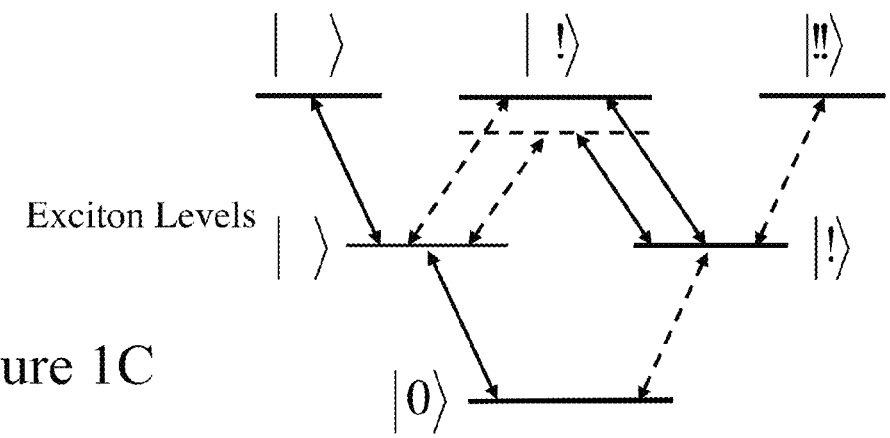
Figure 1D:
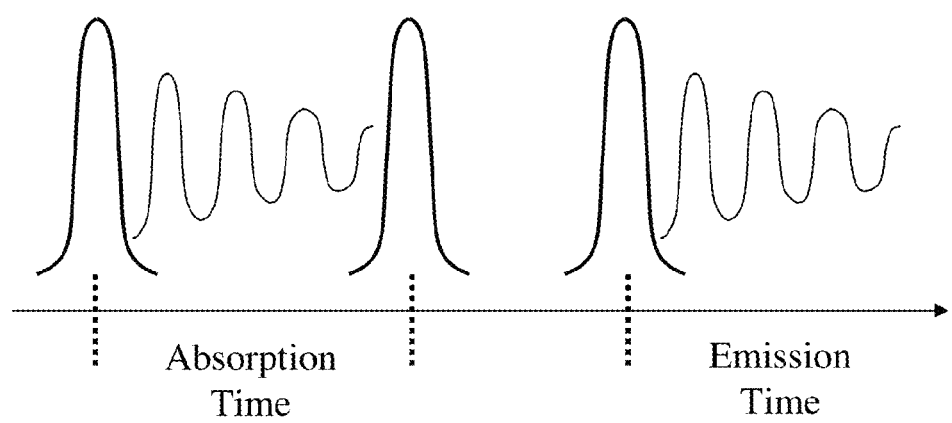
Figure 2A:
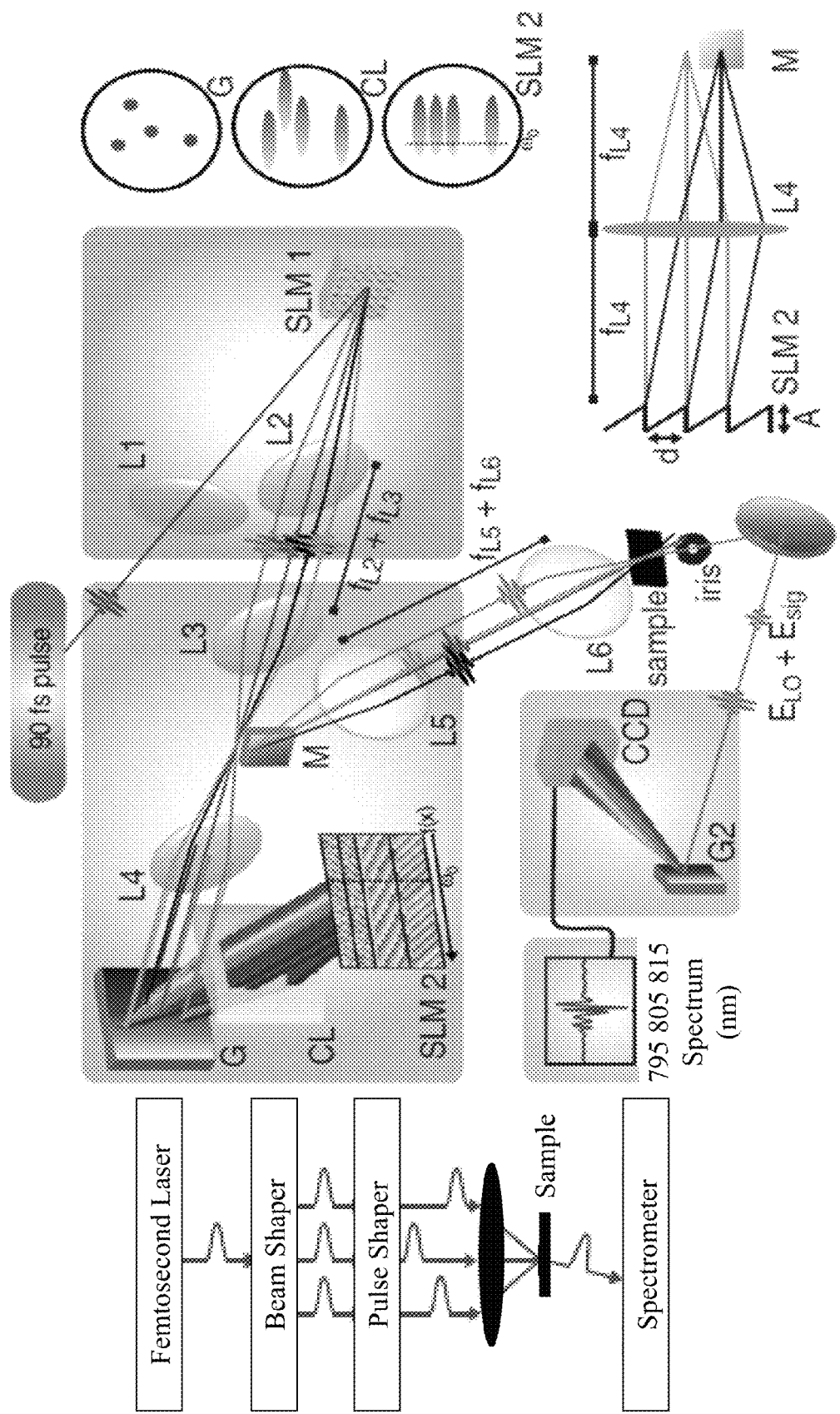
FIG. 2A depicts a 2D optical spectrometer employed by the Keith Nelson group at Massachusetts Institute of Technology.
Figure 2B:
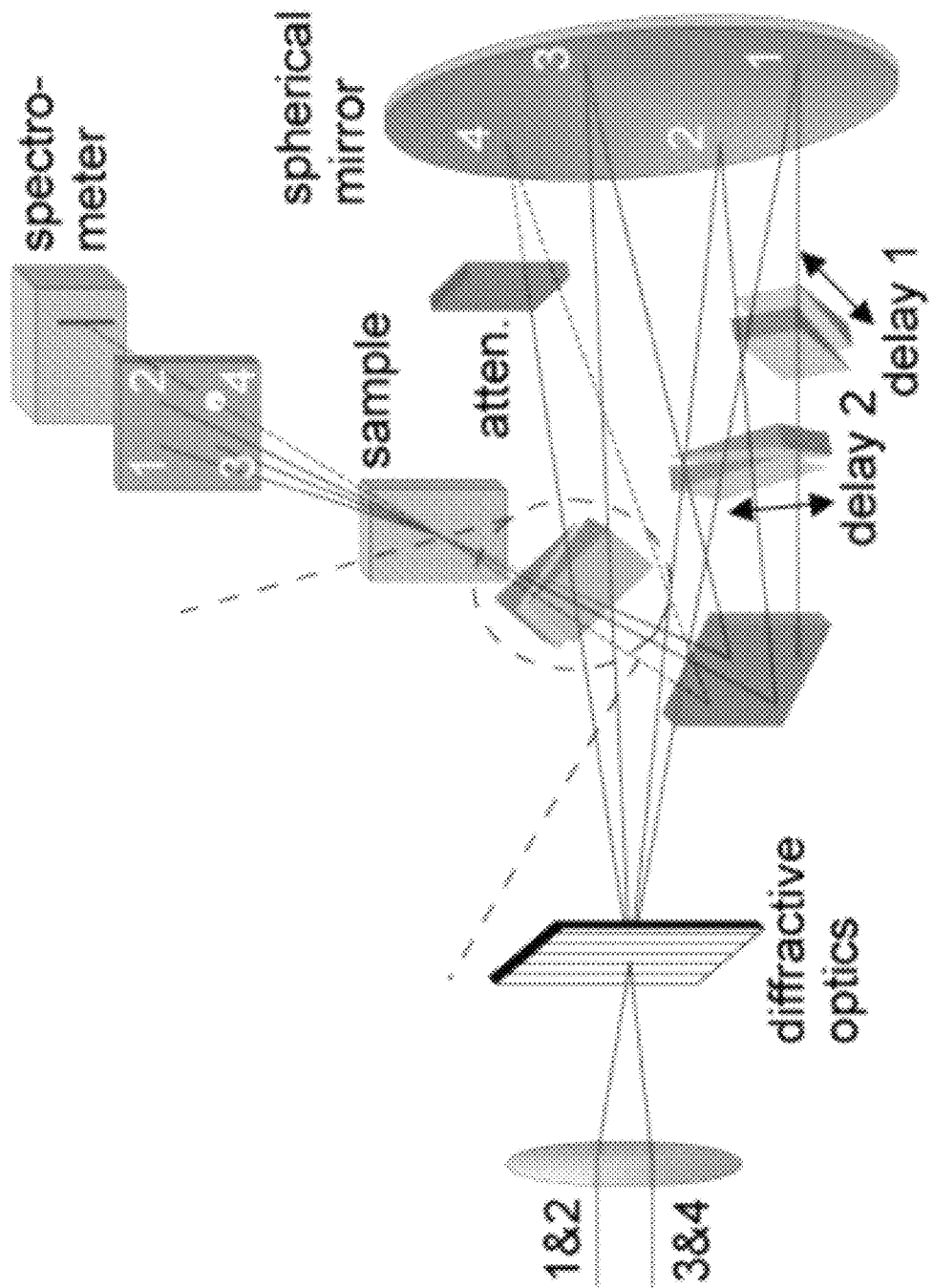
Figure 3A:
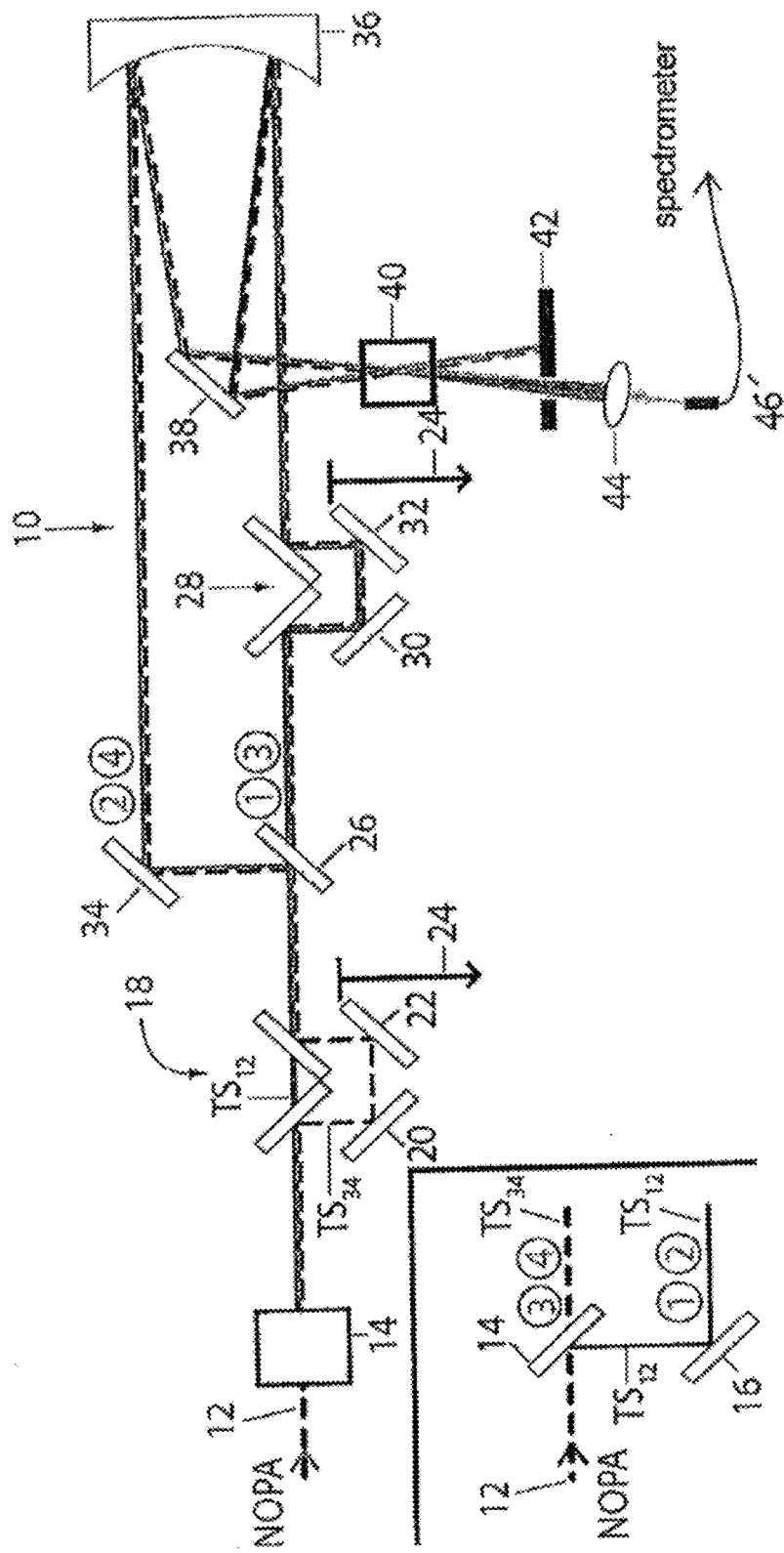
Figure 3C:
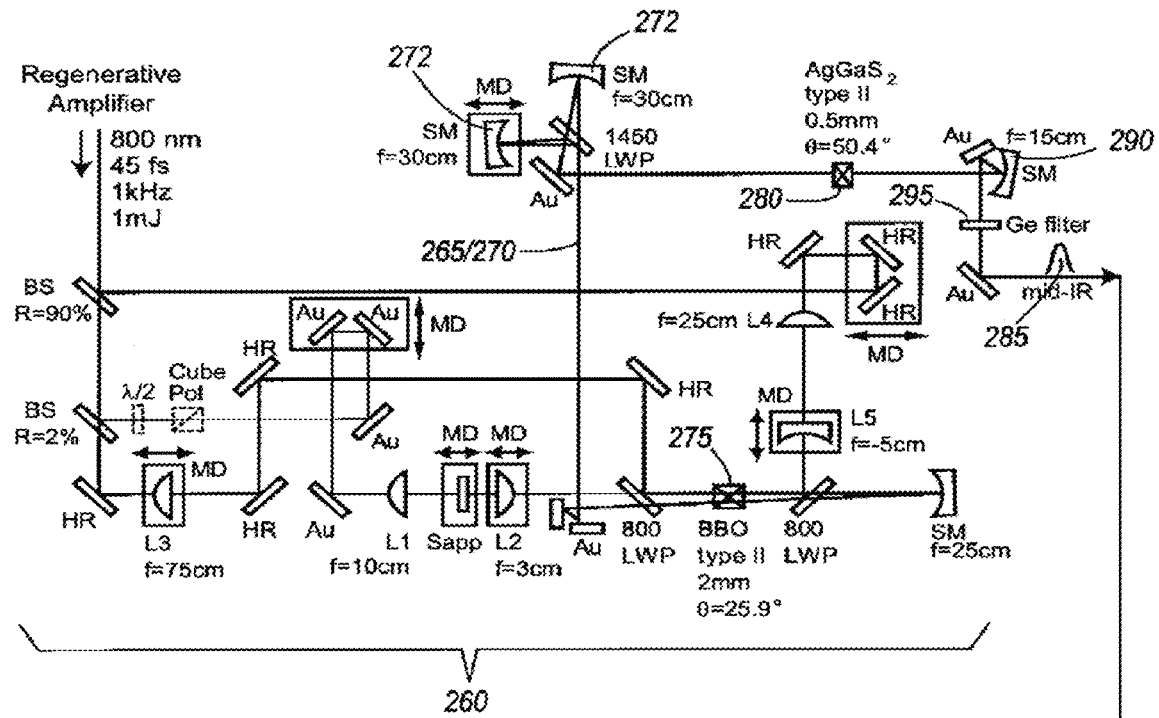
Figure 3C:
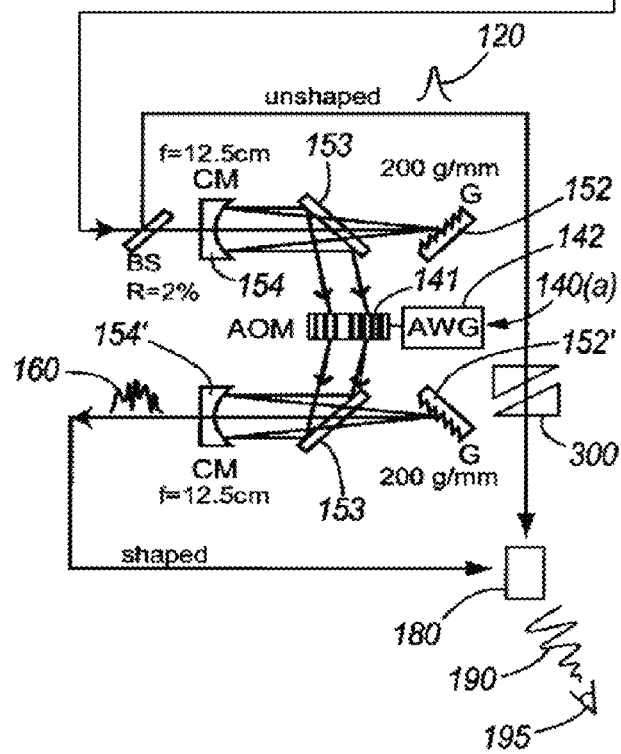

The present invention is directed to optical spectrometry in particular coherent two-dimensional optical spectrometry.

The ensuing description provides exemplary embodiment(s) only, and is not intended to limit the scope, applicability or configuration of the disclosure. Rather, the ensuing description of the exemplary embodiment(s) will provide those skilled in the art with an enabling description for implementing an exemplary embodiment. It being understood that various changes may be made in the function and arrangement of elements without departing from the spirit and scope as set forth in the appended claims.

Two-Colour Two-Dimensional Electronic Spectroscopy: As noted above 2D optical spectroscopy has emerged as a powerful tool that can determine all, or substantial portions thereof, of the nonlinear optical response of a system up to third-order effects. By providing access to specific quantum mechanical pathways, it allows for the measurement of vibrational couplings, electronic couplings, energy transfer and multi-exciton correlations for example. As noted with respect to the prior art 2D experiments can be implemented with different beam geometries, each having its advantages and disadvantages. For example, the boxcar geometry offers background-free detection, thereby eliminating the need for phase cycling; see for example Vaughan et al in "Coherently Controlled Ultrafast Four-Wave Mixing Spectroscopy" (J. Phys. Chem. A, Vol. 111, pp 4873). The collinear geometry, desirable for its simplicity, is easy to extend to higher-order experiments, and allows for both fluorescence and transmission detected experiments; see for example Tian et al in "Femtosecond Phase-Coherent Two-Dimensional Spectroscopy" (Science, Vol. 300, pp 1553-). Additionally the pump-probe geometry has the advantage of directly measuring perfectly phased 2D spectra as it emits both re-phasing and non-rephasing components of the optical signals in the same direction, see for example Grumstrup et al in "Facile Collection of Two-Dimensional Electronic Spectra using Femtosecond Pulse-Shaping Technology" (Opt. Exp., Vol. 15, 16681) and Myers et al in "Two-Color Two-Dimensional Fourier Transform Electronic Spectroscopy with a Pulse-Shaper" (Opt. Exp., Vol. 16, 17420).

Traditionally, the pump-probe configuration employs a single pulse shaper to generate a phase-coherent pump pulse pair, and the probe pulse, which also acts as the local oscillator, is derived from a second source such as a white light continuum or a non-collinear optical parametric amplifier (OPA), see for example Myers and Tekavec et al in "Two-Dimensional Electronic Spectroscopy with a Continuum Probe" (Opt. Lett., Vol. 34, pp 1390-). This configuration works well for one-quantum (1Q) measurements where the pump and the probe pulses are not required to be phase-coherent with each other. However, in the case of two-quantum (2Q) measurements, all optical pulses need to be phase-coherent, which presents a challenge when using separate laser sources to produce pump and probe pulses. Additionally, a single pulse shaper cannot independently control the polarization of each pump pulse; therefore, the polarization of the pump pulses must be identical. This restriction does not allow the use of optimal polarization selective schemes to completely eliminate the background because they require the polarizations of the two pump pulses to be orthogonal.

Accordingly in order to remove the limitations within the prior art the inventors have established an alternative employing dual pulse shapers, for example Acousto-Optic Programmable Dispersive Filters (AOPDFs), which enable independent polarization, phase and amplitude control over each pulse. In this configuration, we can achieve a phase stability of $\sim\lambda/314$ between the two shapers by using active phase stabilization. In addition to being extremely compact, this setup is easily switchable between pump-probe and collinear geometries, allowing for detection in both phase-cycling and phase-matching arrangements. Fast update rates of the AOPDF enable single-shot measurements at 1 kHz, significantly reducing the data acquisition time. Further, embodiments of the invention exploit compression of the unshaped pump pulse before the shaping setup using prism compressors, for example; this compensates for part of the dispersion of the AOPDFs and allows us to produce a delay of up to 4 ps between the shaped pulses.

Figures 4A, 4B:
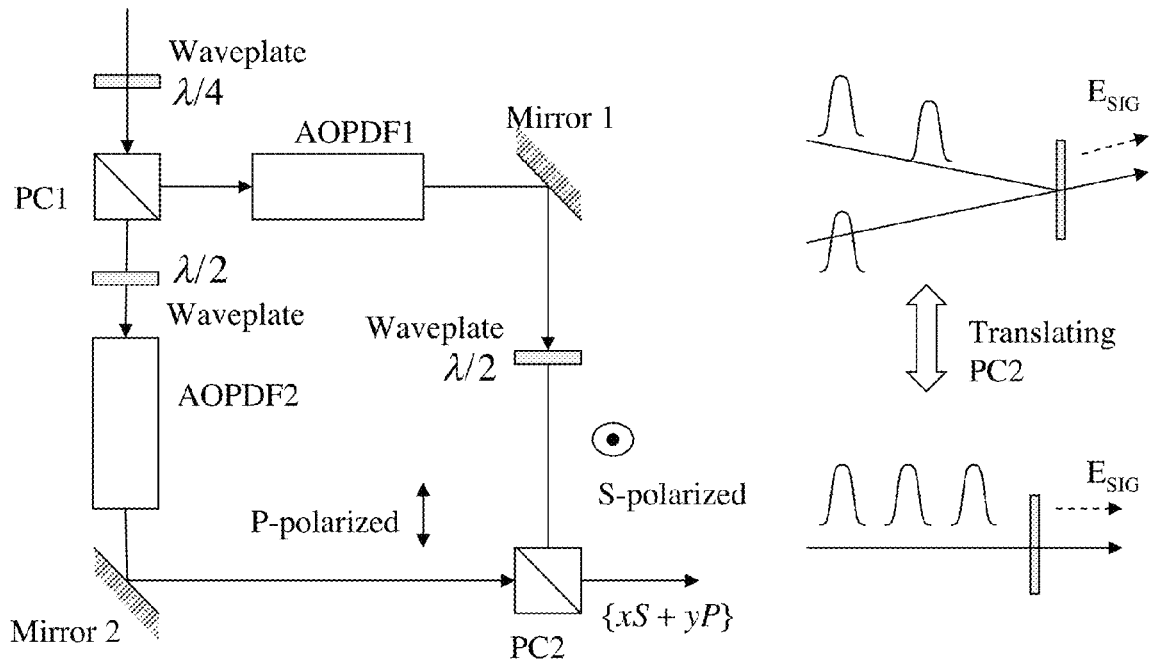
FIG. 4A depicts a schematic of the dual pulse shaper approach according to an embodiment of the invention.
FIG. 4B depicts switching between pump-probe and collinear geometries for a 2D optical spectrometer according to an embodiment of the invention.

Referring to FIG. 4A a schematic of the dual pulse shaper approach according to an embodiment of the invention is depicted employing AOPDF devices which exploit a collinear interaction within an anisotropic birefringent medium. The broadband output of a non-collinear OPA is separated into orthogonal polarization components using a polarizing cube (PC1). Each polarization component is sent through an AOPDF, denoted by first and second AOPDFs AOPDF1 and AOPDF2, to produce shaped pulses, which are then combined using a second polarizing cube (PC2) to produce the desired polarization. Optical isolation is provided through the introduction of half-wave plates ($\lambda/2$). Referring to FIG. 4B the second polarizing cube (PC2) spatially separates the shaped pulses from the two AOPDFs, making it easy to switch between the pump-probe (top) and collinear (bottom) geometries.

The use of AOPDFs, which may be updated at fast updates rates, are driven by RF waveforms enable according to embodiments of the invention, single-shot measurements at rates up to 1 kHz, thereby significantly reducing the data acquisition time of a measurement. According to operating frequency of the AOPDF the waveforms to provide the required pulse profiles may, in some instances, be generated through direct digital synthesis. Dispersion within the pulse shapers, e.g. the AOPDFs, may be compensated within embodiments of the invention through dispersion compensators. Within experimental configurations of the inventors dispersion compensation is provided by initially pre-compressing the unshaped pulse before the shaping set-up using GRISMs, which are a combination of gratings and prisms. This compensates for part of the dispersion of the AOPDFs and has allowed the inventors to produce a maximum delay of >4 ps between the shaped pulses.

Figure 5A:
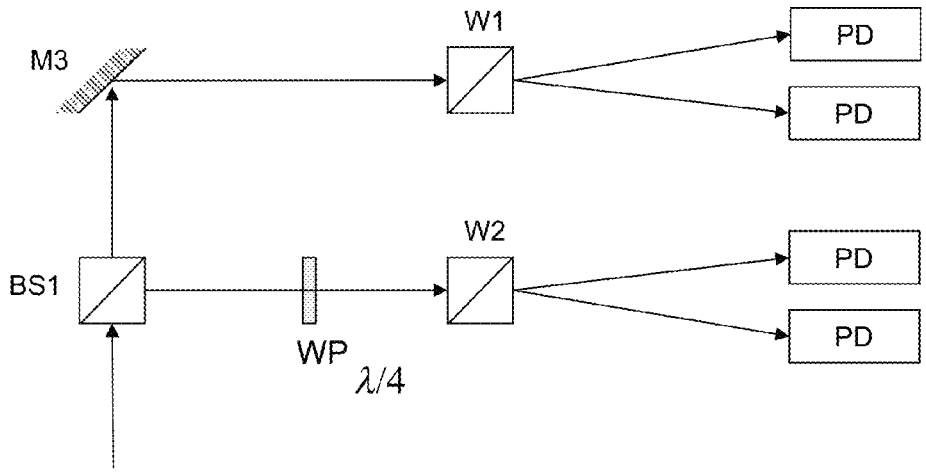
FIG. 5A depicts polarization measurements within a 2D optical spectrometer according to an embodiment of the invention using a simplified Mueller ellipsometer.

As discussed above in respect of FIG. 4A two AOPDFs are employed to generate phase and amplitude shaped pulses, which are combined using the second polarizing cube (PC2) to produce the desired polarization state. Translation of PC2 using a delay stage provides for control of the spatial separation between the pulses from the two AOPDFs and allows for easy switching between pump-probe and collinear geometries as depicted in FIG. 4B. The phase between the two pulses is measured using spectral interferometry, and the polarization is measured using a simplified Mueller ellipsometer, as depicted in FIG. 5A. The ellipsometer measures two quadratures of the polarization state in both linear and circular polarization bases, thus characterizing the polarization of the shaped pulses. Accordingly, the input is initially split with the beam splitter (BS1) and the two outputs are coupled to a pair of Wollaston prisms (W1 and W2) with one output being coupled to its Wollaston prism via a quarter-wave plate ($\lambda/4$). Each Wollaston prism is then coupled to a pair of photodiodes (PD) such that the overall assembly within FIG. 5A measures the intensity of the circularly and linearly polarized components using photo-diodes (PD).

Figure 5B:
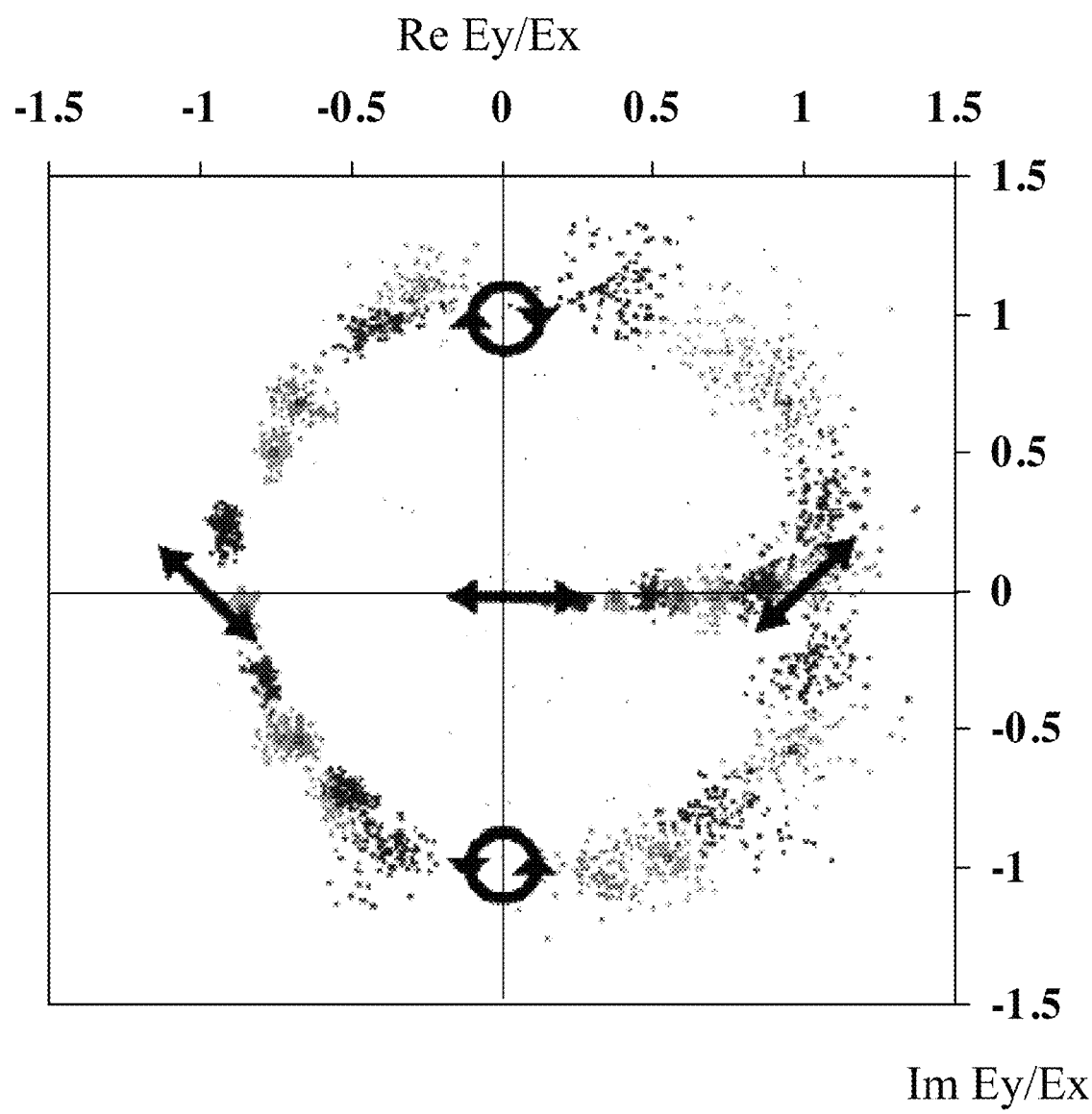
FIG. 5B depicts polarization data from a polarization controllable dual-pulse shaper according to an embodiment of the invention are depicted on a Poincaré sphere.

Now referring to FIG. 5B polarization data from the polarization controllable dual-pulse shaper according to an embodiment of the invention are depicted on a Poincaré sphere for easy visualization. By controlling the spectral phase and amplitude of pulses from each AOPDF and combining them using PC2 pulses in the desired polarization state can be established automatically under simple electrical control of the pulse shaper assembly. The data spanning the circumference of the Poincaré sphere correspond to polarization states of varying ellipticity, from right-handed to left handed circular polarization. The data along the equator correspond to linear polarization.

Synchronization of the two pulse shapers, implemented using AOPDFs in the embodiments of the invention described above in respect of FIGS. 4A through 5B, is important in maintaining good phase stability and in turn, the polarization of the shaped pulses. Using active phase stabilization, the inventors have demonstrated a phase stability of approximately $\lambda/314$ between pulses, which is, to the knowledge of the inventors, the highest reported phase stability to date for pulse pairs generated by AOPDFs. In fact, it surpasses the phase stability produced by a single AOPDF. In addition to unprecedented phase stabilization, this configuration also provides complete polarization control over each shaped pulse.

Experimental Configuration: The ultrafast laser source used in initial experiments of the dual pulse shaper two-colour two-dimensional electronic spectroscopy concept (TCTDES) was an amplified Ti-sapphire laser system (2.5 mJ, 70 fs, 800 nm, 1 kHz). The regenerative amplifier was used to pump two optical parametric amplifiers (OPAs), which were used to produce the pump and the probe pulses. Now referring to FIG. 4A the block diagram of the pulse shaping setup according to an embodiment of the invention is depicted. The output of one OPA was sent to AOPDF 1, which produces the pump pulse pair (532 nm, 10 nm full width half-maximum (FWHM)), and the other OPA was used to produce the probe pulse (616 nm, 25 nm FWHM), which was shaped by AOPDF 2.

In pump-probe geometry, the signal field is emitted in the same direction as the probe and is resolved at 1 kHz using as spectrometer and CCD, for example the Acton SP2500i spectrometer and PIXIS 100B CCD. A color filter was used to block the pump pulses from reaching the detector. The instrument response function (IRF) was measured by cross-correlation between the pump and the probe pulses and was found to be ~60 fs. The coherence time ($t_{coh}$) was scanned from 0 to 200 fs in 0.4 fs time steps for a fixed population time ($t_p$). The energy of the pump and the probe pulses were 25 nJ and 2.5 nJ, respectively. Samples of colloidal CdSe QDs dispersed in toluene were continuously flowed through a 1 mm path length flow cell during the experiment. The optical density of the sample was approximately 0.2.

Figure 6A:
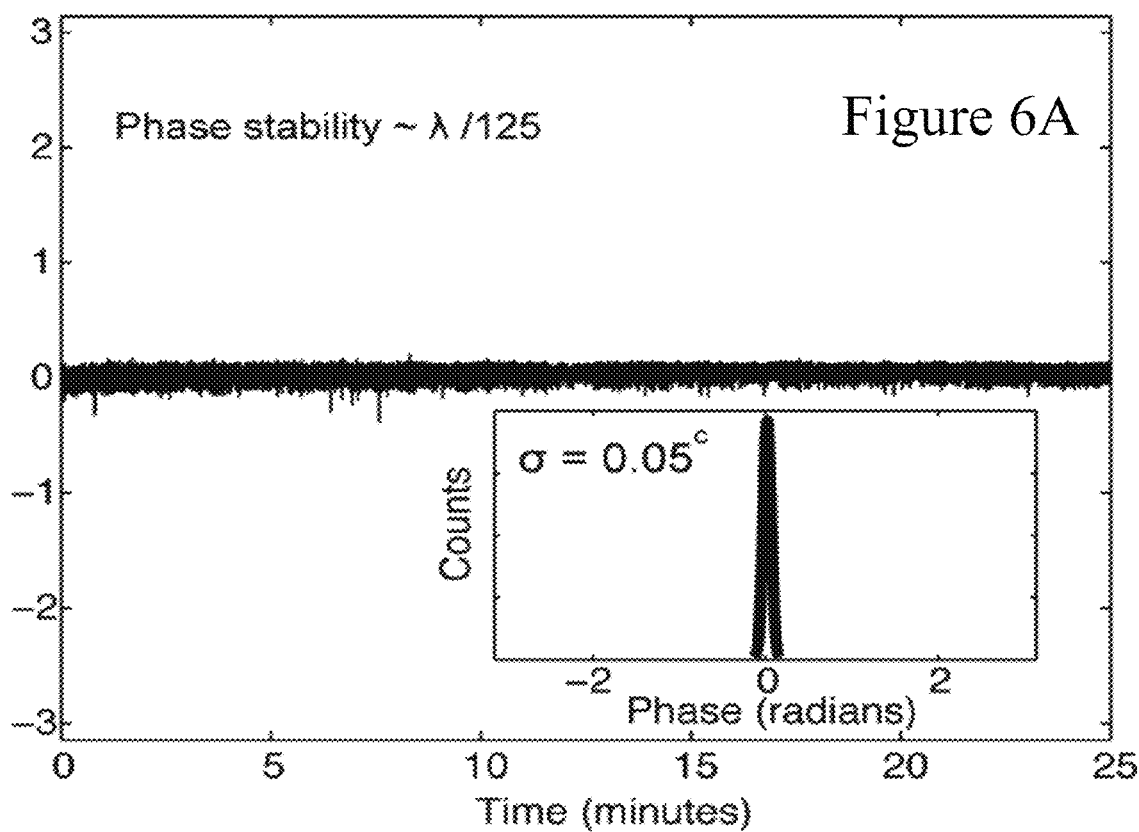
FIGS. 6A and 6B depict results of 1Q and 2Q 2D optical spectroscopy experiments performed using the two geometries shown in FIG. 4B using a 2D optical spectrometer according to an embodiment of the invention.
Figure 6B:
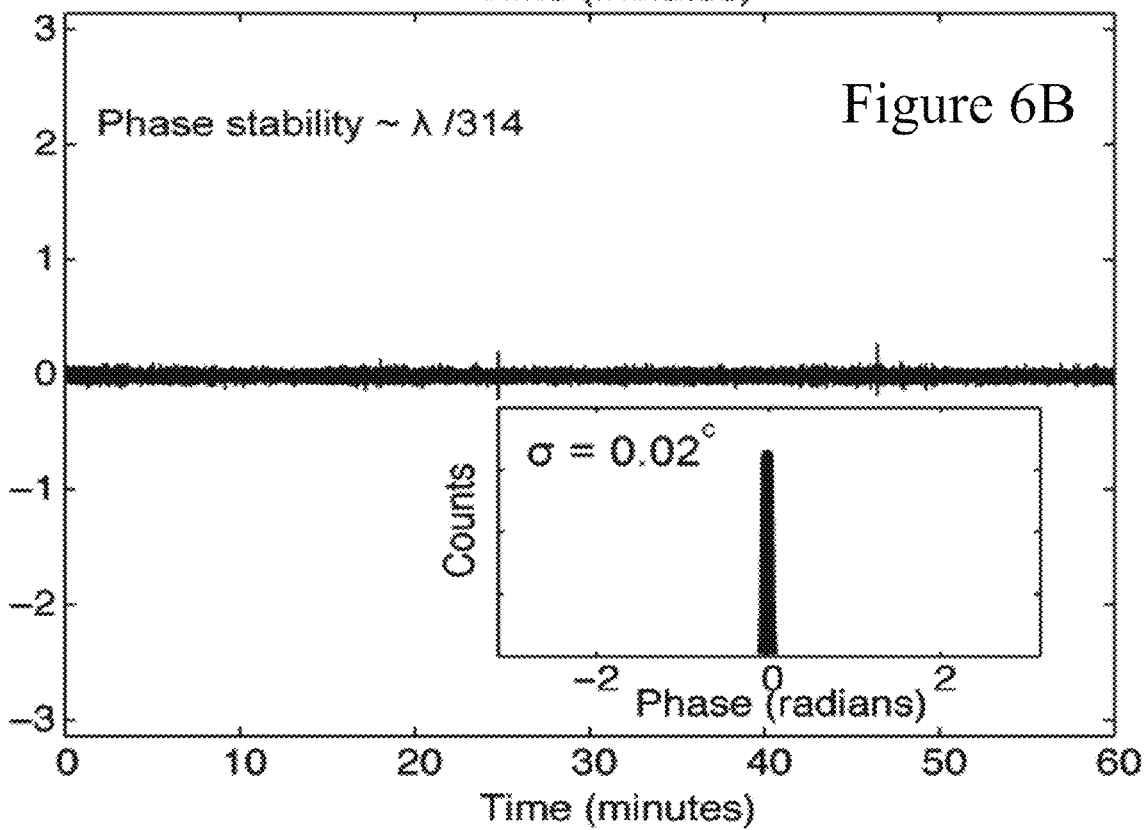

Experimental Results: Prior art experiments have shown that a pulse pair produced by single prior art pulse shaper can maintain a phase stability of approximately $\lambda/85$ at 530 nm over 3 hours, see for example Myers. Essentially, a spectral interferogram between the two pulses was measured to determine their relative phase difference, and the required phase correction is applied in subsequent shots to achieve the target phase difference. The phase stability measurements were performed using spectral interferometry. FIGS. 6A and 6B respectively shows the comparison of the phase stability produced by single AOPDF without active phase stabilization and two AOPDFs with active phase stabilization at 100 Hz (i.e., using every 10th shot to determine the phase correction). In both cases, the shaped pulses had identical spectra and the measurements were made at 630 nm. Using active phase stabilization, the inventors demonstrate phase stability of $\sim\lambda/314$ (at 630 nm over 1 hour) between pulses produced from the two AOPDFs (FIG. 6B), which is, to the inventors knowledge, the highest reported phase stability to date for pulse pairs generated by AOPDFs. In fact, it surpasses the phase stability produced by a single AOPDF (FIG. 6A). By maintaining excellent phase stability between two AOPDFs, the TCTDES setup extends the application of pulse shapers to 2Q measurements.

Another important application of our setup is the ability to independently control the polarization of individual pump pulses at 1 kHz. This is accomplished by combining the pulses produced from the two shapers using a polarizing cube. Because the pulses shaped by the two AOPDFs have orthogonal polarizations (FIG. 4A), by controlling the spectral phase and amplitude of each of these pulses, the TCTDES can achieve any desired polarization state. For example, Middleton et al in "Polarization Shaping in the Mid-IR and Polarization-Based Balanced Heterodyne Detection with Application to 2D IR Spectroscopy" (Opt. Express, Vol. 17, pp. 14526-14533), successfully implemented this principle for polarization control in the mid-infrared (mid-IR). In contrast to their wire-grid polarizer for combining mid-IR pulses, whereas we use a polarizing cube (PC2) for the same purpose in the visible range. PC2 combines the pulses from the two AOPDFs while the feedback loop ensures high phase stability between the two AOPDFs, which is critical to achieve polarization shaping. The translation of PC2 controls the spatial overlap between the two pulses from the two AOPDFs, thereby allowing us to easily switch between collinear and pump-probe geometries. When the pulse pair is perfectly overlapped, collinear polarization shaped pulses are produced. However, when the pulse pair is spatially separated, we lose the ability to independently control the polarization of the individual pump pulses while still maintaining excellent phase stability between the two shapers necessary to perform 2Q experiments. This implies that when using AOPDFs for polarization shaping of individual pump pulses we can either (i) use a separate laser source for the probe pulse and perform the 2D experiments in pump-probe geometry or (ii) use the AOPDFs to shape both pump and probe pulses and perform the experiment in collinear geometry.

To characterize the pulse polarization, the inventors employed a simplified Mueller ellipsometer shown in FIG. 5A. The ellipsometer uses a beam splitter (BS1) and two Wollaston prisms (W1 and W2) to measure two quadratures of the polarization state in both linear and circular polarization bases, thus characterizing the polarization of the shaped pulses. FIG. 5B presents the polarization measurements on a Poincaré sphere for easy visualization. By controlling the phase and amplitude of pulses from each AOPDF and combining them using PC2, the inventors TCTDES can prepare pulses in the desired polarization state. By varying $\Delta\phi$ from 0 to $2\pi$ (in steps of $\pi/10$), we obtain the data spanning the circumference of the Poincaré sphere. These data points correspond to polarization states of varying ellipticity, from right-handed to left-handed circular polarization. By varying the amplitude of one of the pulses from 0 to 1, we obtain data along the equator, which corresponds to linear polarization states.

Figure 8:
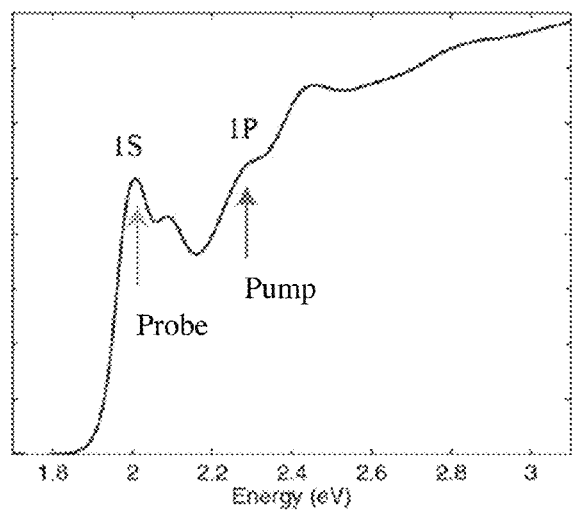
FIG. 8 depicts the linear absorption spectrum of CdSe QDs together with pump and probe pulse energies.

In order to demonstrate the functionality of the dual AOPDF scheme for 2D visible spectroscopy by using colloidal CdSe QDs dispersed in toluene as a test sample. The experiments were performed in pump-probe geometry, with AOPDF 1 producing the pump pulse pair and AOPDF 2 producing the probe pulse. The pump pulses were tuned to the 1P exciton peak, while the probe pulse was set to 1S exciton (FIG. 8). The polarization of the probe pulse was set to 45° relative to the pump pulses. Because the signal field is emitted collinear to the probe pulse that acts as the local oscillator, an analyzer was used to block probe pulse before the detector by setting it at 85° relative to the probe pulse. This allows us to increase the probe intensity without saturating the detector, and the small amount of probe passing through the analyzer allows for heterodyne detection. This polarization scheme significantly enhances the signal-to-noise of the 2D spectrum by predominantly measuring (X+Y)(X+Y)XY=XYXY+YXXY components (where X and Y denote 0 and 90° polarizations, respectively). A small contribution from (X+Y)(X+Y)XX=XXXX+YYXX is also present because the analyzer is not perfectly perpendicular to the probe polarization.

The desired 1Q 2D absorptive spectrum is the sum of the rephasing (R) and nonrephasing (NR) signals.18 In the pump-probe configuration; both of these signals are emitted in the direction of the probe pulse. Thus, the detected signal in pump-probe geometry directly measures the 2D spectrum, unlike the non-collinear geometries where NR and R signals are emitted in different phase-matched directions and must be separately measured, phased, and added to obtain the 2D absorptive spectrum, see for example Khalil et al in "Absorptive Line Shapes in Two-Dimensional Infrared Vibrational Correlation Spectra" (Phys. Rev. Lett., Vol. 90, pp. 047401-1-047401-4). The disadvantage of the pump-probe geometry, however, is that it is not background-free. The unwanted transient absorption signals due to two light-matter interactions from single pump pulse and one from the probe pulse are also emitted in the probe direction. To eliminate the transient absorption background, we employ a two-step phase cycling scheme introduced by Middleton. The phase of the emitted one-quantum signal is given by Equation (1).

$$\phi_{sig} = \pm(\phi_1 - \phi_2) + \phi_3 - \phi_{LO} \tag{1}$$

where, $\phi_{1(2)}$ is the phase of the first (second) pump pulse, $\phi_3$ is the phase of the probe pulse, and $\phi_{LO}$ is the phase of the local oscillator pulse and ±signs refer to NR and R components, respectively.

Figure 7:
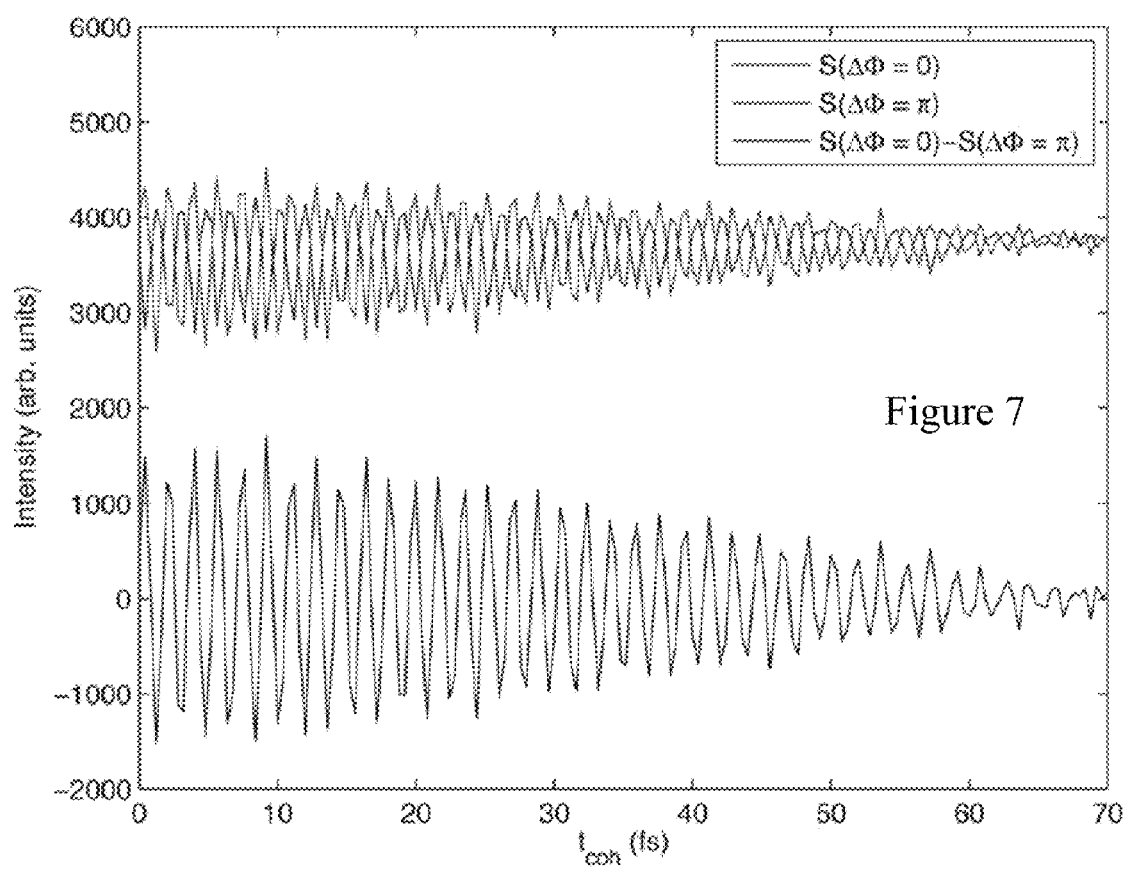
FIG. 7 depicts the two-step phase-cycling scheme with the measured data for $\Delta\phi=0$ and $\Delta\phi=\pi$ together with the processed results to enhance the amplitude of the desired 2D signal whilst reducing background.

In pump-probe geometry, because the probe pulse acts as the local oscillator, that is, $\phi_3 = \phi_{LO}$, the phase of the NR and R signals is independent of $\phi_3$ and is equal to $\pm(\phi_1 - \phi_2)$, respectively. From the discussion above, it follows that changing $\Delta\phi = (\phi_1 - \phi_2)$ by '$\delta$' changes the phase of the desired 2D signal by the '$\delta$' as well, while keeping the phase of the transient absorption signal unchanged. Therefore, subtracting measured signals corresponding to $\Delta\phi = 0$ and $\Delta\phi = \pi$ will enhance the desired 2D signal while eliminating the transient absorption background. FIG. 7 shows the detected signal as a function of $t_{coh}$ for $\Delta\phi = 0$ and $\Delta\phi = \pi$ at a probe wavelength of 616 nm and $T_p = 250$ fs. Changing $\Delta\phi$ by $\pi$ changes the phase of the desired oscillatory signal by $\pi$ as well, while the background remains unchanged (red and blue curves). The subtracted signal is shown as the black curve in FIG. 7. This phase-cycling procedure enhances the amplitude of the desired signal while simultaneously eliminating the background that does not depend of $\Delta\phi$.

To obtain the absorptive 2D spectrum, we acquire data as a function of $t_{coh}$ at fixed $T_p$ for $\Delta\phi = 0$ and $\Delta\phi = \pi$. Since the inventors spectrally resolve the heterodyned signal using a spectrometer and CCD, the signal is collected in the frequency domain; that is, the detected signal can be written as $S(t_{coh}, T_p, \lambda_3; \Delta\phi)$. The first step is to obtain the background-free signal, $S(t_{coh}, T_p, \lambda_3) = S(t_{coh}, T_p, \lambda_3; 0) - S(t_{coh}, T_p, \lambda_3; \pi)$. We then perform a Jacobian transformation to obtain the data as a function of frequency $v_3$, followed by interpolation to get equally spaced intervals along $v_3$, which gives us $S(t_{coh}, T_p, f_3)$. We further subject our data to symmetry and causality conditions, as proposed by Myers. Because the first two pulses are essentially interchangeable, the data must be symmetric with respect to $t_{coh} = 0$, or, in other words, the Fourier transform of $S(t_{coh}, T_p, f_3)$ along $t_{coh}$ must be purely real. We enforce this symmetry condition by selecting the real part of the Fourier transform of $S(t_{coh}, T_p, f_3)$ (i.e., $\text{Re}[S(t_{coh}, T_p, f_3)]$ and inverse Fourier transforming it to obtain $S(t_{coh}, T_p, f_3)$ which is symmetric with respect to $t_{coh} = 0$. Next, we inverse Fourier transform this signal along $f_3$ to obtain $S(t_{coh}, T_p, t_3)$. Because no signal is emitted at negative $t_3$, that is, if the probe pulse interacts with the sample before the pump pulse, $S(t_{coh}, T_p, t_3) = 0$ for $t_3 < 0$. We apply this causality condition by multiplying $S(t_{coh}, T_p, t_3) = 0$ with the Heaviside step function $\Theta(t_3)$. Finally, Fourier transforming the resulting signal along both $t_{coh}$ and $t_3$ gives us the complex absorptive 2D spectrum $S(\upsilon_1, T_p, \upsilon_3)$. This analysis procedure can be summarized as Equations (2) through (6) respectively.

$$S(t_{coh}, T_p, \lambda_3) \to S(t_{coh}, T_p, f_3) \text{ Jacobian transformation} \tag{2}$$

$$S(t_{coh}, T_p, f_3) \to S(f_1, T_p, f_3) \text{ Fourier transform along } t_{coh} \tag{3}$$

$$S(f_1, T_p, f_3) \to S(t_1, T_p, f_3) \text{ Inverse Fourier transform of } \text{Re}[S(t_{coh}, T_p, f_3)] \text{ along } f_1 \tag{4}$$

$$S(t_{coh},T_p,f_3) \to S(t_1,T_p,t_3) \text{ Inverse Fourier transform along } f_3 \quad (5)$$

$$S(t_1,T_p,t_3) \to S(\upsilon_1,T_p,\upsilon_3) \text{ Fourier transform of } \Theta(t_3) \times S(t_1,T_p,t_3) \text{ along } t_1 \text{ and } t_3 \quad (6)$$

Figure 9A:
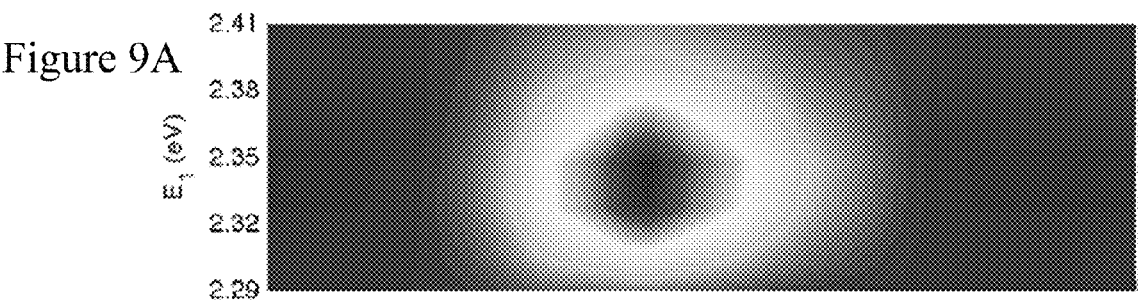
FIGS. 9A through 9C depict the real, imaginary, and absolute parts of the 2D absorptive spectrum of CdSe QDs at $T_p=500$ fs.
Figure 9B:
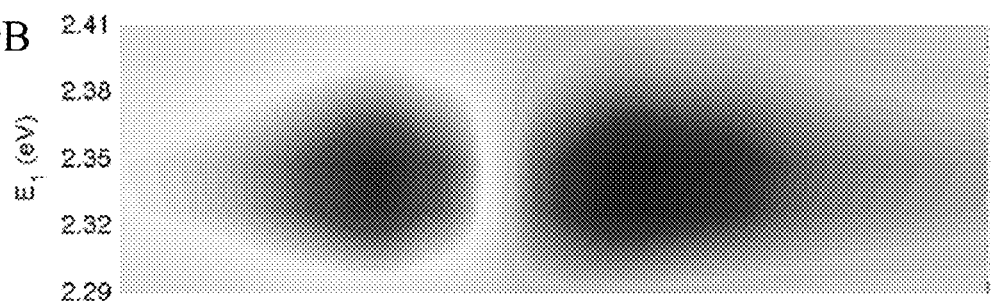
Figure 9C:
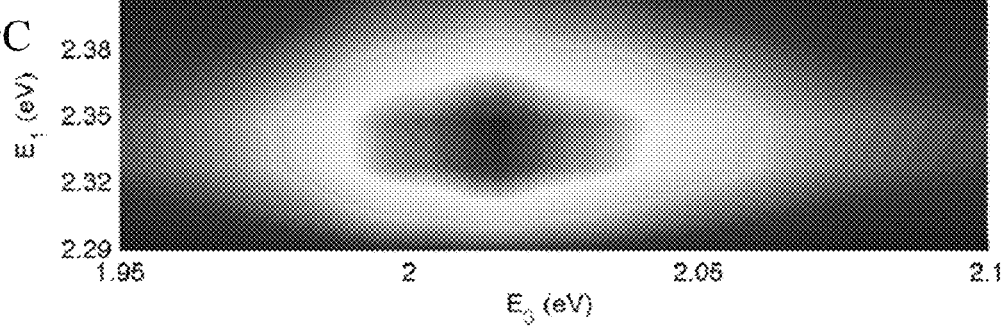
Figure 10A:
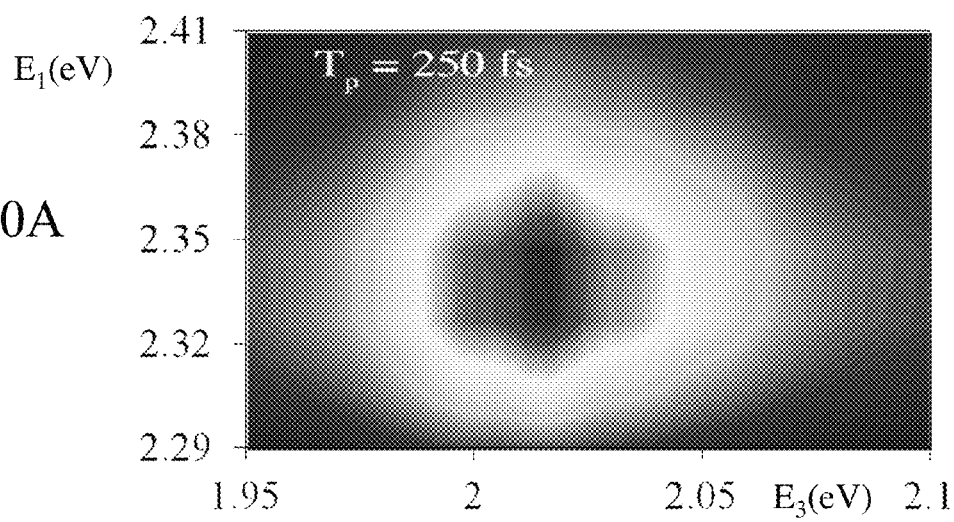
FIGS. 10A through 10E depict the absolute part of the 2D absorptive spectra for CdSe quantum dots for $T_p=250, 500, 1000, 1500, 2000$ fs respectively.
Figure 10B:
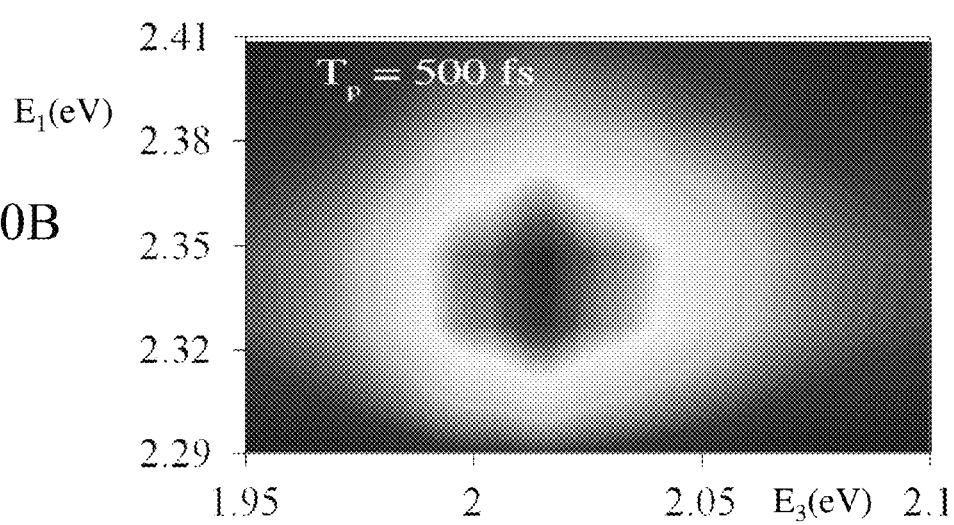
Figure 10C:
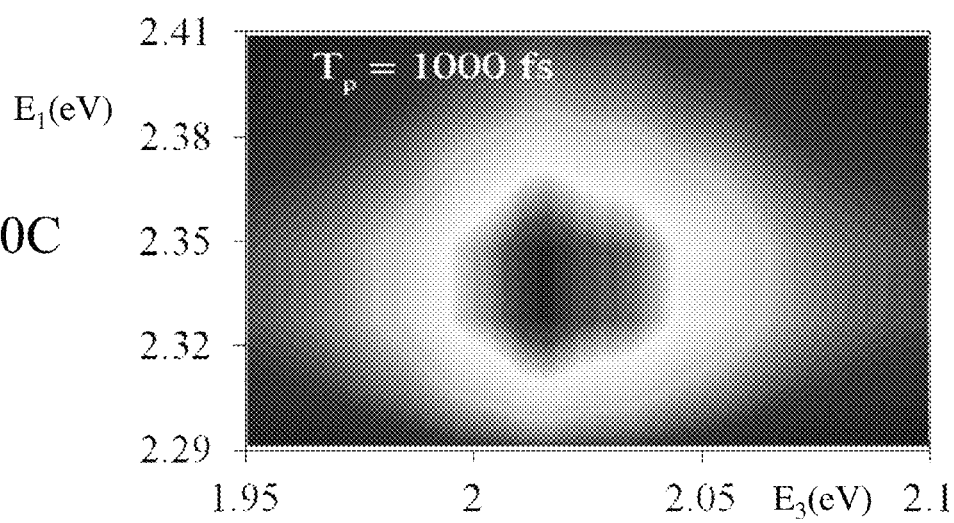
Figure 10D:
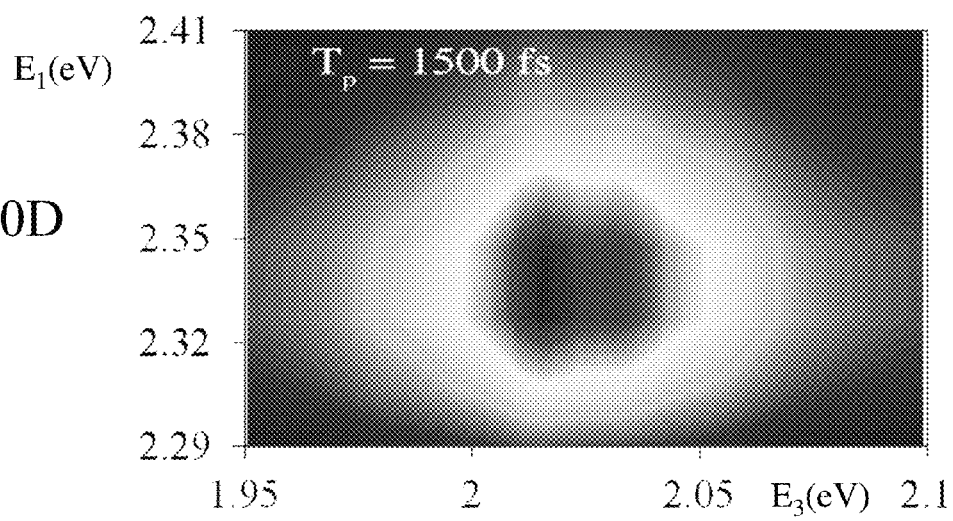
Figure 10E:
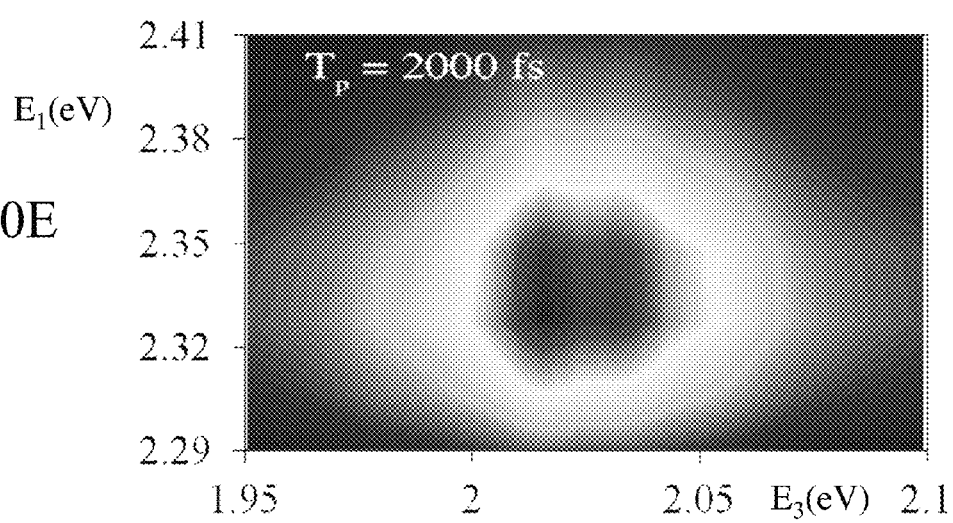
Figure 10F:
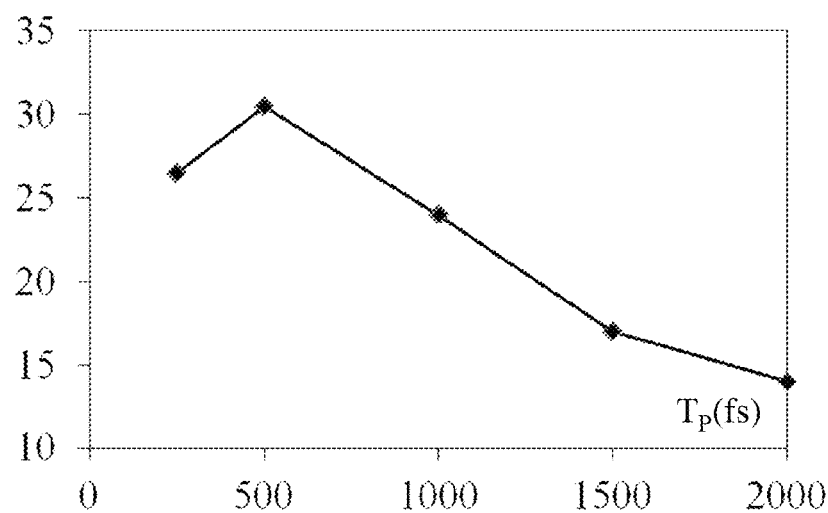
FIG. 10F depicts the maximum peak intensity of the peak at $(E_1, E_3)=(2.340, 2.015$ eV$)$ as function of population time.

Now referring to FIGS. 9A to 9C there are depicted the absorptive 2D spectrum obtained using the above analysis at $T_p=500$ fs. The horizontal axis corresponds to the emission axis obtained by Fourier transformation with respect to $t_3$, and the vertical axis, corresponding to excitation, is obtained by Fourier transformation along the $t_{coh}$ axis. The two-color approach measures the coupling between different excitonic transitions, which in this case are 1P and 1S excitons (FIG. 9A). The real part of the 2D spectrum has an absorptive line shape, whereas the imaginary part is dispersive in character. The population time dependence of the 2D spectrum is shown in FIGS. 10A through 10E at 250 fs, 500 fs. 1000 fs, 1500 fs, and 2000 fs respectively whilst the maximum peak intensity is plotted in FIG. 10B as a function of $T_p$(fs). As evident the peak at $(E_1, E_3)=(2.340, 2.015$ eV$)$ broadens and decreases in intensity with increasing $T_p$, which is indicative of population relaxation. Whereas these 2D spectra are shown merely to demonstrate the functionality of the dual-shaper setup, we note that the observed line shape and population relaxation are consistent with previous measurements, see for example Zhang et al in "Phase-Cycling Schemes for Pump-Probe Beam Geometry Two-Dimensional Electronic Spectroscopy" (Chem. Phys. Lett., Vol. 550, pp 156-161). The 2D measurements presented here do not utilize the polarization control capabilities of the TCTDES set. Such a comprehensive analysis of polarization-dependent signals will be presented in the scientific literature by the inventions at a latter date.

Within the pump-probe geometry, one can further extract R and NR signals from the measured 2D spectrum by employing three-step phase-cycling schemes, see for example Myers; Yan et al in "Phase Cycling Schemes for Two-Dimensional Optical Spectroscopy with a Pump-Probe Beam Geometry" (Chem. Phys., Vol. 360, pp. 110-115), and Tan et al in "Theory and Phase-Cycling Scheme Selection Principles of Collinear Phase Coherent Multi-Dimensional Optical Spectroscopy" (J. Chem. Phys., Vol. 129, pp. 124501-1-124501-3), whereas a fully collinear geometry requires at least a ten-step phase-cycling procedure to extract desired signals, see for example Tian and Tan.

Accordingly, embodiments of the invention provide for a dual-shaper configuration for a TCTDES with active phase stabilization. This configuration maintains excellent phase stability between the two pulse shapers, thereby extending the application of AOPDFs to 2Q measurements. Further these configurations allow independent control of the polarization of individual shaped pulses. Previously, 2D spectroscopy has been used to study many-body effects in quantum wells and excitonic fine-structure in QDs by mapping multiexcitonic interactions on a 2D plane. By offering polarization control over individual shaped pulses, this dual shaper setup further allows for the study of optical selection rules in QDs.

It would be evident to one skilled in the art that alternative techniques for pulse shaping ultrashort pulses exist including for example liquid crystal devices (LCDs) or acousto-optic modulators (AOMs) placed in the Fourier plane of a grating exploiting a zero dispersion 4f configuration as well as spatial light modulators (SLMs) which spatially mask a spatially dispersed frequency spectrum. With AOMs and LCDs different wavelengths are spatially separated and may be addressed individually although changing the wavelength requires careful realignment thereby precluding easy tunability. Similarly with SLMs as the input optical waveform must be spatially dispersed and recombined input and output gratings are required. Accordingly with varying input wavelength either the gratings must be tuned or the SLM's spatial mask adjusted to accommodate the shifted spectral mapping to the spatial mask. Hence, SLMs with a large number of pixels are required and independent phase and amplitude control requires dual SLM devices, see for example Stobrawa et al in "A new High Resolution Femtosecond Pulse Shaper" (App. Phys. B, Vol. 72, No. 5, pp 627-630) and Weiner in "Femtosecond Pulse Shaping using Spatial Light Modulators" (Rev. Sci. Inst., Vol. 71, no. 5, pp 1929-1960).

In contrast the AOPDF provides spectral phase and amplitude pulse shaping by controlling the amount of extraordinary versus ordinary propagation in the optical path for each spectral component. Collinear acousto-optic interactions provide such control in easy-to-align devices with reduced size.

It would be evident that the overall design methodology presented supra with respect to embodiments of the invention provides for a compact platform, which may in some embodiments be monolithic, which provides simplicity and robustness enabling the invention to be packaged into a module for commercial deployment in 2D optical spectroscopy instruments and that automatic re-configuration may be provided for the dual pulse shaper elements allowing computer controlled polarization shaping of the complete electric field. Additionally, under computer control the modules would enable both one quantum and two quantum signals as well as polarization switching.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
    receiving from an optical source a plurality of pulses, each pulse characterized by a profile relating to at least one of frequency, phase, polarization and time;
    coupling the pulse to a pair of pulse shapers to generate a pair of modified pulses, each pulse shaper being able to modify the profile of the pulse in at least one aspect;
    coupling the pair of modified pulses to a sample via a combiner positionable between a first position and a second position, wherein
        in the first position the combiner establishes a pump-probe configuration of characterizing the sample, and in the second position the combiner establishes a collinear configuration of characterizing the sample.

2. The method according to claim 1 wherein,
at least one pulse shaper of the pair of pulse shapers is an acousto-optic programmable dispersive filter.

3. The method according to claim 1 wherein,
the pulse shapers allow modification of the pulse shape between sequential groups of a plurality N of pulses which provide N−1 pump pulses and a single probe pulse.

4. The method according to claim 1 further comprising:
coupling the optical pulses after their coupling to the sample to a polarization analyser supporting simultaneous determination of quadrature components of linear and circular polarization signals.

5. A system comprising:
a beam splitter for receiving from an optical source coupled to the system a plurality of pulses, each pulse characterized by a profile relating to at least one of frequency, phase, polarization and time;
first and second pulse shapers optically coupled to each output of the beam splitter, each pulse shaper being configured to modify the profile of the pulse in at least one aspect;
a combiner receiving the outputs from the first and second pulse shapers and coupling them to
a sample to be characterized, the combiner positioned between a first position and a second position, wherein in the first position the combiner establishes a pump-probe configuration of characterizing the sample, and
in the second position the combiner establishes a collinear configuration of characterizing the sample.

6. The system according to claim 5 wherein,
at least one pulse shaper of the pair of pulse shapers is an acousto-optic programmable dispersive filter.

7. The system according to claim 6 wherein,
the pulse shapers allow modification of the pulse shape between sequential groups of a plurality N of pulses which provide N−1 pump pulses and a single probe pulse.

8. The system according to claim 1 further comprising:
a polarization analyser receiving the optical pulses after their coupling to the sample, the polarization analyser providing simultaneous determination of quadrature components of linear and circular polarization signals.

9. The system according to claim 5 wherein,
the combiner in the first position establishes the system as a one quantum optical spectrometer; and
the combiner in the second position establishes the system as a two quantum optical spectrometer.

* * * * *